(12) United States Patent
Player et al.

(10) Patent No.: US 6,542,590 B1
(45) Date of Patent: Apr. 1, 2003

(54) MULTIPLE USER TELEPHONE ACCOUNTING

(75) Inventors: Mark Player, Gymea Bay (AU); Mankin Leung, Croydon (AU)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/449,901

(22) Filed: Dec. 2, 1999

(30) Foreign Application Priority Data

Dec. 3, 1998 (AU) .............................................. PP7447

(51) Int. Cl.⁷ .............................................. H04M 15/00
(52) U.S. Cl. .............................. 379/114.26; 397/121.03; 397/127.03
(58) Field of Search ........................... 379/111, 112.01, 379/114.01, 114.26, 126, 127.01, 127.03, 133–134, 121.03

(56) References Cited

U.S. PATENT DOCUMENTS 4,769,834 A * 9/1988 Billinger
4,776,004 A * 10/1988 Bauer et al.
5,181,238 A * 1/1993 Medamana et al.
6,195,419 B1 * 2/2001 Gilboy

* cited by examiner

Primary Examiner—Duc Nguyen
(74) Attorney, Agent, or Firm—Sughrue Mion, PLLC

(57) ABSTRACT

Businesses with a number of clients have a need to allocate communication costs to the client on whose behalf the costs were incurred. This invention provides a means whereby the telecommunication carrier can charge call costs originating from a single line 2 to one of a plurality of accounts 8 selected by the user of the phone 1.

At the exchange 3, a flag 5 associated with line 2 notifies the processor 6 that an account A/C No must be selected before a call can be made via line 2. A Recorded Voice Message (RVM) or specific dial tone is sent to the user of the phone 1 to notify him of the need to select an account (optionally after entering a PIN). When the user selects the account, the line 2 is enabled to initiate a call through the network via switch 4. The processor 6 charges the cost for the call to the selected account.

7 Claims, 2 Drawing Sheets

MULTIPLE USER TELEPHONE ACCOUNTING

TECHNICAL FIELD

This invention relates to the charging of telecommunication services and will be described in the context of selectively charging services delivered via a single communication line to a selected one of two or more accounts associated with that line. This may be useful eg. in a solicitor's office where calls are to be billed to different clients.

BACKGROUND ART

Traditionally the services delivered via a telephone line have been charged to a single account associated with that line.

Australian patent No. 664611 describes a telephone subset where the cost of calls may be charged against different users each of whom has a personal identification number, using information stored in the subset.

The phone owner could set a credit limit for each PIN, eg., equivalent to a pre-paid amount and the phone could deduct call cost in accordance with tariff scales stored in the phone.

However, it was possible to circumvent this arrangement by replacing the PIN locked phone with a standard phone and the call costs would be charged to the phone owner.

DISCLOSURE OF THE INVENTION

This invention provides an arrangement in which telecommunication services provided over a single line can be charged selectively to a selected one of two or more accounts, wherein, at the exchange a flag in a first memory is set indicating that an account access code is required before a call can be initiated from that line, the exchange being responsive to the call access code to enable a call to be established and to charge the call cost to an account identified by at least part of the account access code.

According to a first embodiment of the invention, there is provided an arrangement for enabling telecommunication services provided over a line connected to a network to be charged to a selected one of two or more accounts associated with the line, the arrangement including:

first register means within the network to indicate that the line is associated with said two or more accounts;

control means responsive to the first register means to prevent the establishment of a connection initiated over the line until an access code has been received over the line;

wherein, on receipt of the access code, the control means enables the establishment of a call initiated over the line and causes the cost for the service to be charged to an account identified by the access code.

BRIEF DESCRIPTION OF THE DRAWINGS

The invention will be described with reference to the accompanying drawings in which.

BEST MODE OF CARRYING OUT THE INVENTION

Figure 1:
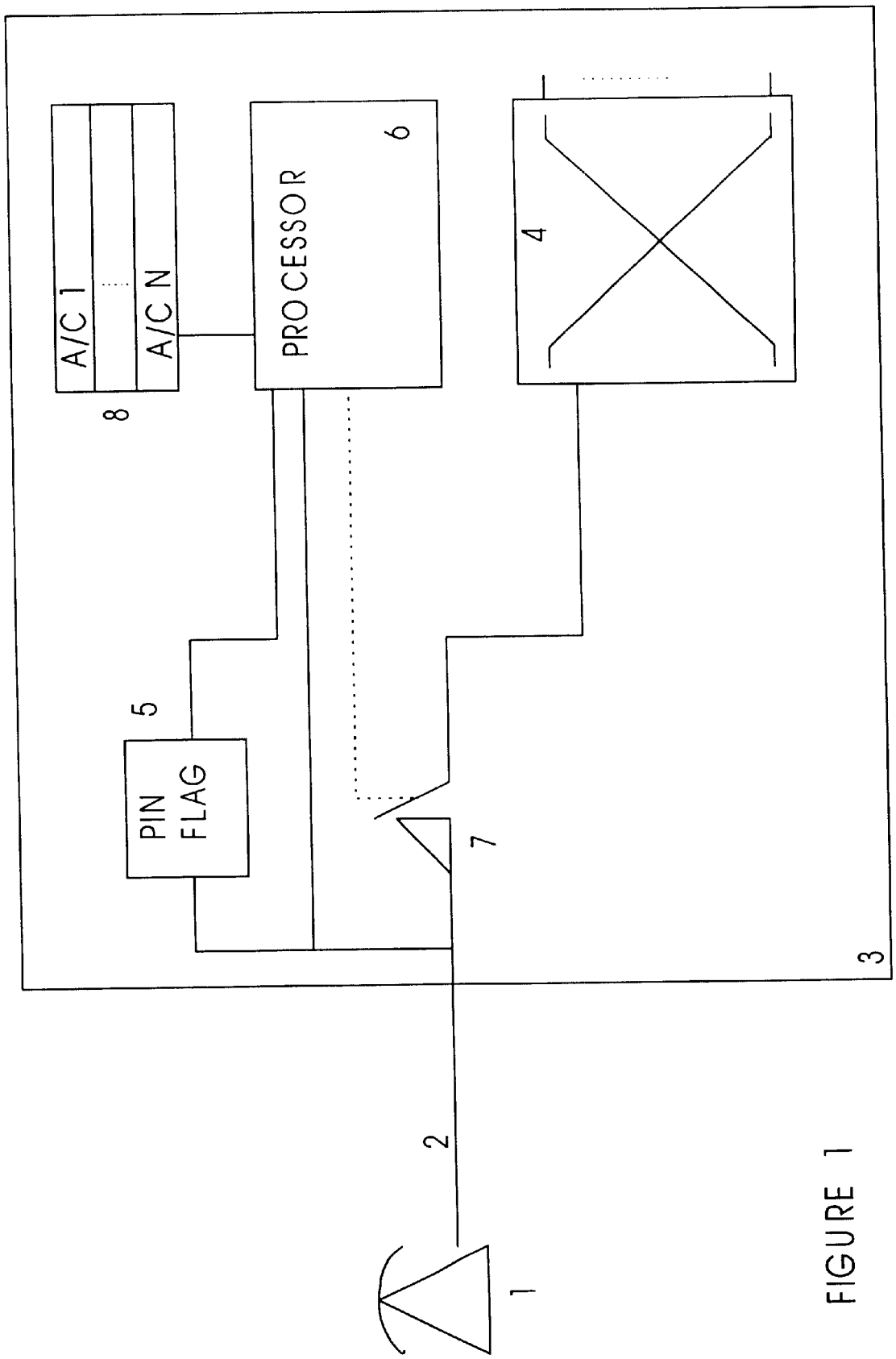
FIG. 1 is a schematic representation of an arrangement embodying the invention.

The invention will be described with reference to the drawings in which FIG. 1 illustrates schematically an arrangement embodying the invention. In FIG. 1, a telephone 1 is connected into the network via a line 2 at exchange 3. The exchange 3 includes a switching matrix 4 and a processor 6 which controls the establishment and charging of calls. In accordance with an embodiment of the invention, an access flag is associated with line 2 to alert the processor 6 that no call is to be set up via line 2 until an account access code has been sent from the user. This feature is illustrated schematically by a switch 7 which can be operated by processor 6 on receipt of the account access code. When the processor 6 receives the access code, the processor enables the caller using phone 1 to set up a call via switching matrix 4 and selects an account in memory 8 identified by the access code to which the call is to be charged.

Preferably, the network initiates voice messages and/or telephone display messages to guide the user through the process of setting up the system to charge a call to a selected account.

Preferably, the account access code includes information identifying the account to which the call is to be charged and the system also requires the user to use a PIN to verify the authenticity of the call.

With the trend to sophisticated network management systems, much of the functionality of this arrangement may be at a more centralized location in the network and need not be resident at the point of entry into the network. For instance, the access flag, accounting memory, much of the processing functionality and recorded voice announcement facilities may be located eg. at the network management centre controlling the exchange.

Optionally, at the end of each call, the system may be programmed to charge subsequent calls to the same account until a new account is selected or until a predetermined code is entered to prevent outgoing calls until a new account is selected.

Figure 2:
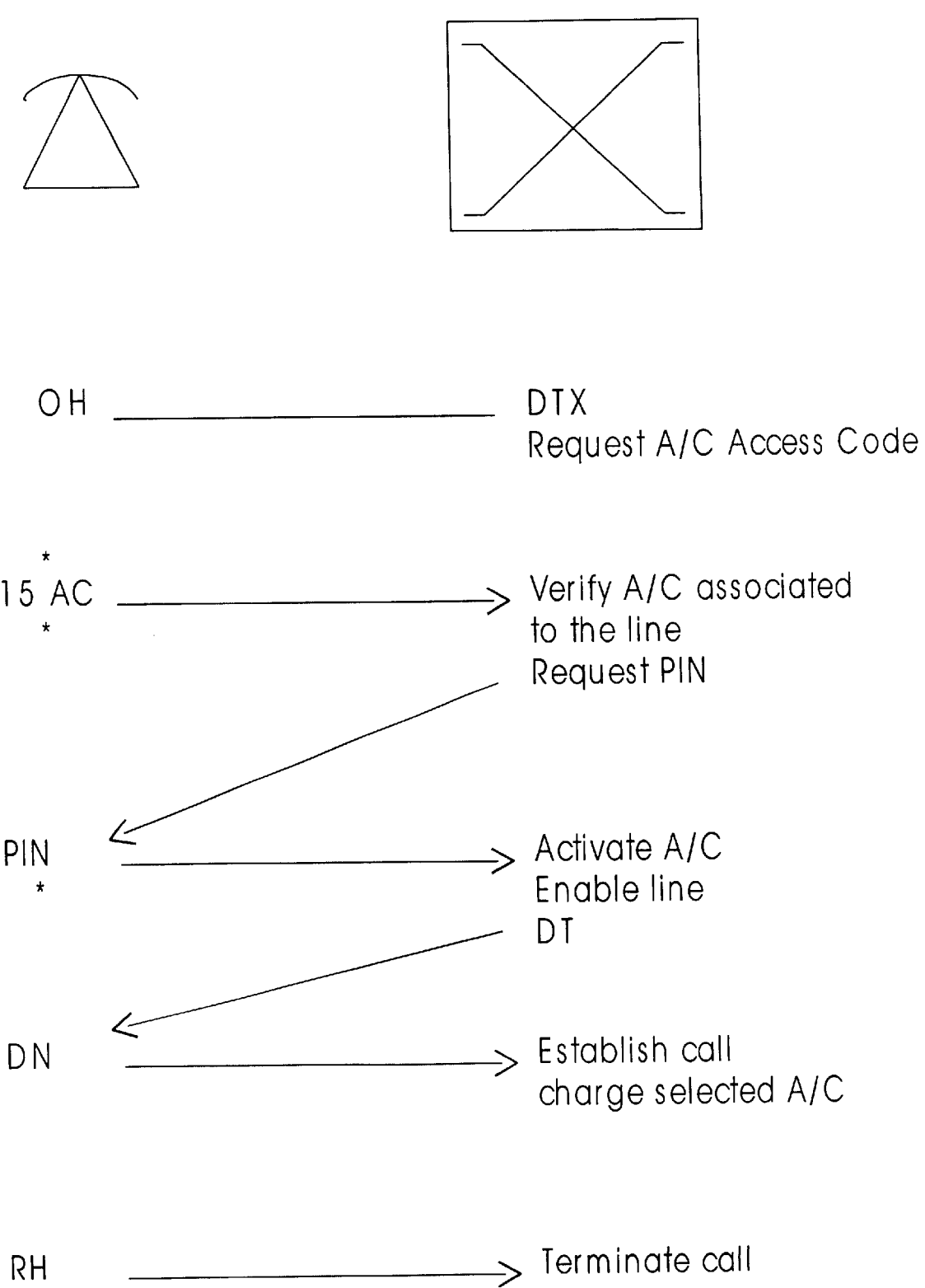
FIG. 2 is a command flow chart showing the exchange of instructions between the network and the user for setting up an outgoing call.

The operation of the arrangement is illustrated schematically in FIG. 2 at the subscriber's end the user goes Off Hook (OH). This causes the network to send a request for an account access code eg. by Recorded Voice announcement or by a special dial tone (DTX).

The user then enters a predetermined code eg. *15AC* where AC is an account identification number. The network management system verifies that the line is associated with the account. For additional security, the network may request a PIN.

When the user has provided the account access code (and PIN if necessary) the network activates the account, enables the line, and provides normal dial tone (DT) or otherwise notifies the user to dial the required destination number. The call is established in the normal way when the subscriber dials the required number (DN). At the end of the call the user replaces the handset (RH) and the network terminates the call and charges the cost to the selected account.

The claims defining the invention are as follows:

1. An arrangement for enabling telecommunication services provided over a line connected to a network, the telecommunication services charged to a selected one of two or more accounts associated with the line, the arrangement including:

a communication terminal;

an exchange;

a communication line through which said communication terminal communicates with said exchange; and a switch in said communication line;

wherein said communication line is identified by said exchange as having two or more accounts; and wherein said switch prevents establishment of a connection initiated over the communication line from said communication terminal until an access code is received by said exchange from said communication terminal, said access code including account information identifying a particular one of the two or more accounts that will be charged for a subsequent connection made after receipt of the access code.

2. The arrangement according to claim 1, wherein said exchange notifies said communication terminal to enter a destination number after the access code is received and verified by said exchange.

3. The arrangement according to claim 1, wherein said exchange includes said switch, a processor, a switching matrix, and storage for account numbers.

4. The arrangement according to claim 3, wherein said exchange includes an access flag identifying said communication line as having two or more accounts and alerting said processor that an access code is required prior to establishment of the connection initiated over the communication line from said communication terminal.

5. The arrangement according to claim 1, wherein said switch prevents establishment of the connection initiated over the communication line from said communication terminal until a PIN is received by said exchange from said communication terminal.

6. A method of enabling telecommunication services provided over a line connected to a network to be charged to a selected one of two or more accounts associated with the line, the method including:

storing information within the network to indicate that the line is associated with said two or more accounts; and preventing the establishment of a connection initiated over the line until an access code has been received over the line;

wherein an access code is received, enabling the establishment of a call initiated over the line and charging the cost for the service to an account identified by the access code; and wherein said telecommunication services enables calls between a first communication terminal connected to said line and a second communication terminal associated with a destination number, said method further including the step of notifying said first communication terminal to enter the destination number after the access code is received and verified.

7. An arrangement for enabling telecommunication services provided over a line connected to a network, the telecommunication services charged to a selected one of two or more accounts associated with the line, the arrangement including:

a terminal interface;

an exchange;

a communication line connecting said terminal interface with said exchange; and a switch in said communication line;

wherein said communication line is identified by said exchange as having two or more accounts; and wherein said switch prevents establishment of a connection initiated over the communication line through said terminal interface until an access code is received by said exchange from through said terminal interface, said access code including account information identifying a particular one of the two or more accounts that will be charged for a subsequent connection made after receipt of the access code.

* * * * *